(12) United States Patent
Munoz Delgado

(10) Patent No.: US 11,314,989 B2
(45) Date of Patent: Apr. 26, 2022

(54) TRAINING A GENERATIVE MODEL AND A DISCRIMINATIVE MODEL

(71) Applicant: Robert Bosch GmbH, Stuttgart (DE)

(72) Inventor: Andres Mauricio Munoz Delgado, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 134 days.

(21) Appl. No.: 16/924,731

(22) Filed: Jul. 9, 2020

(65) Prior Publication Data

US 2021/0019572 A1 Jan. 21, 2021

(30) Foreign Application Priority Data

Jul. 19, 2019 (EP) ..................................... 19187339

(51) Int. Cl.
*G06K 9/62* (2022.01)
*G06N 3/08* (2006.01)

(52) U.S. Cl.
CPC ......... *G06K 9/6262* (2013.01); *G06K 9/6256* (2013.01); *G06N 3/08* (2013.01)

(58) Field of Classification Search
CPC ...... G06K 9/6262; G06K 9/6256; G06N 3/08; G06N 3/084; G06N 7/005; G06N 3/0454; G06N 3/0445; G06N 3/0481; B60R 16/02; G05D 1/0221
USPC ...................................................... 382/157
See application file for complete search history.

(56) References Cited

U.S. PATENT DOCUMENTS

| | | | |
|---|---|---|---|
| 2018/0260957 A1* | 9/2018 | Yang | G06T 7/0012 |
| 2020/0334809 A1* | 10/2020 | Vianu | G06N 7/005 |
| 2020/0394459 A1* | 12/2020 | Xu | G06N 5/04 |

OTHER PUBLICATIONS

Goodfellow, I, et al., "Generative Adversarial Nets," Cornell University Library, 2014, pp. 1-9. https://arxiv.org/abs/1406.2661.
Isola, P, et al., "Image-To-Image Translation With Conditional Adversarial Networks," Cornell University Library, 2018, pp. 1-17. https://arxiv.org/abs/1611.0700.

(Continued)

*Primary Examiner* — Juan A Torres
(74) *Attorney, Agent, or Firm* — Norton Rose Fulbright US LLP; Gerard Messina

(57) ABSTRACT

A system for training a generative model and a discriminative model. The generative model generates synthetic instances from latent feature vectors by generating an intermediate representation from the latent feature vector and generating the synthetic instance from the intermediate representation. The discriminative model determines multiple discriminator scores for multiple parts of an input instance, indicating whether the part is from a synthetic instance or an actual instance. The generative model is trained by backpropagation. During the backpropagation, partial derivatives of the loss with respect to entries of the intermediate representation are updated based on a discriminator score for a part of the synthetic instance, wherein the part of the synthetic instance is generated based at least in part on the entry of the intermediate representation, and wherein the partial derivative is decreased in value if the discriminator score indicates an actual instance.

16 Claims, 3 Drawing Sheets

(56) References Cited

OTHER PUBLICATIONS

Karnewar, A, et al., "MSG-GAN: Multi-Scale Gradients GAN for More Stable and Synchronized Multi-Scale Image Synthesis," Cornell University Library, 2019, pp. 1-9. https://arxiv.org/abs/1903.06048.
Li, D, et al., "MAD-GAN: Multivariate Anomaly Detection for Time Series Data With Generative Adversarial Networks," Cornell University Library, 2019, pp. 1-17. https://arxiv.org/abs/1901.04997.

* cited by examiner

TRAINING A GENERATIVE MODEL AND A DISCRIMINATIVE MODEL

CROSS REFERENCE

The present application claims the benefit under 35 U.S.C. 119 of European Patent Application No. EP 19187339.7 filed on Jul. 19, 2019, which is expressly incorporated herein by reference in its entirety.

FIELD

The present invention relates to a system for training a generative model and a discriminative model, and to a corresponding computer-implemented method. The present invention further relates to a computer-readable medium comprising instructions to perform the method and/or parameters of the generative model and/or discriminative model.

BACKGROUND INFORMATION

A major challenge when applying machine learning models in the area of automotive perception systems is the availability of training and test data. For example, such data can include image data and various other types of sensor data, which may be fused to establish a 360-degree view around a vehicle. The more such data is available, the better the training and testing that can be performed. Unfortunately, it is hard to obtain such data. Indeed, obtaining real data requires testing the automotive perception system in actual traffic situations. Not only is it costly to drive around test vehicles with such systems installed, it can also be dangerous if decisions are based on an automotive perception system that has not yet been fully trained. Also, collecting real data would require collecting data for a lot of different combinations of various parameters, e.g., amount of daylight, weather, amount of traffic, etc. In particular, it is hard to collect real-world data, to perform proper training and testing of corner cases of such models, such as near-collisions. More generally, in various application areas and especially when applying machine learning to sensor data, there is a need to efficiently obtain realistic test and training data.

In "Generative Adversarial Networks" by I. Goodfellow et al. (available at arxiv.org/abs/1406.2661 and incorporated herein by reference), a so-called generative adversarial network (GAN) is described. Such a GAN comprises a generative model for generating synthetic data that can be used, e.g., to train or test another machine learning model. The generative model is trained simultaneously with a discriminative model that estimates the probability that a sample came from the training data rather than the generator. The generative model is trained to maximize the probability of the discriminative model making a mistake while the discriminative model is trained to maximize the accuracy of the estimated probability that the sample came from the training data. Promising results have been reached with generative adversarial networks (GANs). For example, GANs have been shown to be able to reproduce natural looking images at high resolution and at sufficient quality to even fool human observers.

Unfortunately, existing approaches for training GANs are unsatisfactory. In comparison to training just a discriminative model, training a discriminative model together with a generative model is typically harder, e.g., involving not one but two main components that work adversarially in a zero-sum game and are trained to find a Nash equilibrium. For example, in various cases, early in the training the discriminative model may be so good at distinguishing between real and synthetic instances that it may be too hard for the generative model to generate convincing synthetic images. For example, in various cases, the training process of GANs has been observed to get stuck reasonably early in the training process with the generative model focussing on particular aspects that it fails to make progress on. It is however difficult to detect or correct for this: the loss curves of the GAN training process do not provide a good measure of the quality of generated synthetic instances, and since the generator and discriminator depend on each other, any apparent patterns in the learning history of the components are hard to interpret. This also decreases confidence that meaningful training of the generator has occurred.

SUMMARY

In accordance with a first aspect of the present invention, a system for training a generative model and a discriminative model is described. In accordance with a further aspect of the present invention, a computer-implemented method of training a generative model and a discriminative model is described. In accordance with an aspect of the present invention, a computer-readable medium is described.

The above aspects of the present invention involve training a generative model to generate synthetic instances from latent feature vectors, and a discriminative model to discriminate between synthetic and actual instances, e.g., images, audio waveforms, etc. The training process may involve repeatedly training the discriminative model to decrease a first loss of distinguishing between the actual instances and synthetic instances generated by the generative model and training the generative model to decrease a second loss of generating synthetic instances which the discriminative model indicates to be actual instances.

Interestingly, the discriminative model may be configured to determine multiple discriminator scores for multiple parts of an input instance. Such a discriminator score for a part of the input instance may indicate whether that part is from a synthetic instance or an actual instance. For example, a common distinguisher may be applied to the respective parts of the input instance, with a final discriminator score for the overall input instance being determined based on the discriminator scores for the respective parts, e.g., by averaging. The part of an input image that affects a discriminator score may be referred to as its receptive field. Preferably, the receptive fields of the respective discriminator scores cover the whole input instance. In case of images, respective discriminator scores may be obtained by applying the distinguisher in a convolutional fashion to respective regions of the image. Typically, the parts of the input instance are overlapping, e.g., the discriminator scores may be obtained by convolutionally applying the distinguisher to the input instance using a stride that is smaller than the size of the parts. In the context of images, obtaining a discriminator score by averaging over outputs of a distinguisher over smaller regions, known as "patches", of the image, is known per se as a way to force the discriminator to only model the local structure of the images, see for example, P. Isola et al., "Image-to-Image Translation with Conditional Adversarial Networks" (available at arxiv.org/abs/1611.07004 and incorporated herein by reference).

However, in accordance with the present invention, such discriminator scores for parts of an input instance can be used not just to base a final discriminator score on, but also to obtain useful feedback about the training process. Because traditional training just uses the final discriminator score, the generative model can potentially update all parts of its current synthetic instance, in a wildly unconstrained way, to convince the discriminative model that it has produced a real sample. Accordingly, with traditional approaches it can take a long time before the right modifications are made that make the discriminative model start to believe the authenticity of generated samples.

Interestingly however, the discriminator scores provide access to the assessment of the discriminative model at a much higher level of detail than the final discriminator score: the discriminator scores may be regarded as indicating root causes of the classification by the discriminative model. The inventors realized that this detailed information may be leveraged to improve the training of the generative model. Indeed, if a discriminator score for a part of a synthetic instance indicates an actual instance, this may indicate that the generator model has performed well on generating that part of the synthetic instance. Hence, it may be beneficial to ensure that parameters of the generative model affecting this part of the synthetic instance are updated less during the training than parameters of the generative model affecting other parts of the synthetic instance that the discriminator is less convinced are real.

Accordingly, the inventors devised a way to incorporate such feedback into the training process. In various cases, a generative model generates a synthetic instance from a latent feature vector by generating an intermediate representation from the latent feature vector and generating the synthetic instance from the intermediate representation. For example, this is the case if the generative model comprises a network with one or more convolutional layers for successively refining the synthetic instance. Such a generative model may be trained by backpropagation, wherein a gradient of a loss with respect to the intermediate representation is computed, and the loss is then further backpropagated based on the computed gradient. In a traditional approach, such a loss would be based generally on the overall discriminator score of the whole synthetic instance rather than on any individual discriminator scores of its parts.

Interestingly however, the inventors devised to update the gradient of the loss with respect to the intermediate representation of the generative model based on discriminator scores for parts of the synthetic instance. Specifically, a partial derivative of the loss with respect to an entry of the intermediate representation may updated based on a discriminator score for a part of the synthetic instance which is generated based at least in part on the entry of the intermediate representation. For example, the partial derivative may be decreased in value if the discriminator score indicates an actual instance, e.g., decreased compared to its previous value or compared to the value it gets if the discriminator score does not indicate an actual instance. This way, updates to parts of the generative model responsible for generating realistic parts of the synthetic image may be discouraged compared to parts of the generative model that are responsible for generating less realistic parts and for which there may thus be more room for improvement. It will be understood that by "decreasing", a decrease in absolute value is meant instead of, e.g., making a negative value even more negative.

With these measures, quicker, more robust, and/or more explainable training of the generative model may be obtained. In contrast to traditional training, the use of discriminator scores for parts of a synthetic instance may effectively provide an explicit cue of which parts of the synthetic instance need more modification, and which parts need less. By using these discriminator scores, the risk of overwriting good parts of the synthetic instances in following training steps may be decreased. This may help the optimization reach its lowest cost point faster.

Moreover, the discriminator scores for parts of the synthetic instance may indicate progress of the training of the generative model by indicating which parts of the synthetic instance are considered to be good by the discriminative model, and accordingly, which parts of the synthetic instance the generative model is currently focussing on to improve. For example, discriminator scores may be provided to a user of the training system, or to another component controlling the training process, as an explanation of what happens throughout the training process. Accordingly, the discriminator scores may provide evidence that a meaningful model is being learned beyond known metrics such as cross-entropy or mean squared error in the context of accuracy. For example, the discriminator scores may be used to determine whether the generative model has assimilated particular important parts of the training data instead of, for example, learning a simple proxy to a complex problem in a manner that is not immediately clear to the developers.

It is noted that by means of the presented measures, the various advantages may be attained in a relatively efficient way. For example, at a high level, few changes may be needed to existing GAN training procedures, e.g., no inner training loops, external saliency methods, explicit attention maps, additional inputs to the generator, etc., may be needed, providing a relatively fast and natural solution.

Optionally, the models work on images. The generative model may be configured to generate synthetic images. The discriminator model may be configured to determine discriminator scores indicating parts of an input image. For example, the parts of an input image may comprise overlapping rectangular regions of the image. Images are of particular interest not only because they are used in a wide range of applications such as automotive control systems, medical image analysis, etcetera; but also because they allow well-performing generative models to be used in which intermediate representation entries affect well-defined parts of the synthetic image.

In the case of images, interestingly, there may be a spatial correspondence between the regions of the image and the discriminator scores they affect. In that sense, the discriminator scores may themselves be seen as an image. For example, if discriminator scores are determined by moving a fixed-size patch horizontally and vertically over an image, then the discriminator scores may be turned into an image by using the same horizontal and vertical spatial relations for the discriminator scores. It is noted that a same kind of spatial correspondence may also be present for other modalities that can be modelled as spatial grids, e.g., audio.

Optionally, the generative model comprises a neural network. The synthetic instance may be computed from the intermediate representation by one or more convolutional layers of the neural network. For example, such convolutional layers may be combined with pooling layers, ReLU layers, and other types of layers known for convolutional neural networks. Interestingly, when using convolutional layers, there is typically a well-defined relation between regions of subsequent convolutional layers in terms of how they affect each other. For example, the dimensions of an output of a convolutional layer may correspond to one or more instances of the synthetic instance to be generated, e.g., the convolutional layer may output one or more images that are the same size, or a scaled version of, the synthetic images they generate. Because relations between subsequent layers, e.g., spatial relations in the case of images, may be preserved between layers, the use of convolutional layers allows to pinpoint well which part of a synthetic instance is generated by which part of the neural network, which may allow feedback on the generation in the form of discriminator scores to be used particularly effectively. For example, the intermediate representation may be an output of a convolutional layer. Especially if the discriminator scores have a similar correspondence to parts of the synthetic image as the intermediate representation of the generative model, e.g., if also the discriminative model comprises a convolutional neural network, the feedback mechanism as discussed above may be particularly direct in the sense that, possibly after scaling, particular discriminator scores correspond to particular values of the convolutional layer output.

Optionally, the intermediate representation of the generative model may be computed in a layer of the neural network, for example, a convolutional neural network or other type of neural network. It may be beneficial for this layer to occur relatively far into the neural network. For instance, the number of layers preceding the layer may be greater than or equal to the number of layers succeeding said layer. At least, the layer may be in the final 75% of layers of the neural network, or even in the final 25% of layers of the neural network. Using later layers may be beneficial because it allows a larger part of the neural network to make use of the feedback signal.

Optionally, the discriminative model comprises a neural network, in which respective discriminator scores may be computed by a convolutional layer of the neural network based on respective receptive fields in the synthetic instance. For example, in the case of images, each spatial unit in the output of the discriminative model may have a well-defined receptive field in the input instance. This way, as also discussed above, a well-defined correspondence between parts of the synthetic instance and respective discriminator scores may be achieved, for example, a spatial correspondence in the case of images. In fact, in case of images, the convolutional layer output may be regarded as an image itself that may be used, e.g., as an input to a further neural network, as an output presented to a user, etc.

Optionally, discriminator scores determined by the discriminative model form a first volume of data and the intermediate representation generated by the generative model forms respective second volumes of data. For example, the outputs of the discriminative model may form a first volume having the same spatial dimensions as one or more of the volumes of the intermediate representation. The first and second volumes may be related by scaling, e.g., a sub-volume of the first volume having a particular part of the input image having a particular receptive field, may correspond by scaling to a sub-volume of the second volume that affects largely the part of the synthetic image corresponding to that receptive field. This way, a particularly direct feedback mechanism may be achieved in which the use of the discriminator score leads to a particularly relevant update to the intermediate representation. The gradient of the loss may be updated by scaling the discriminator scores from the first volume to the respective second volumes and updating respective partial derivatives based on respective scaled discriminator scores. For example, the volume representing the discriminator scores may be upscaled or downscaled to the size(s) of the second volumes, with respective upscaled discriminator scores being used 1-to-1 to update respective entries for each second volume.

Optionally, respective partial derivatives are updated based on respective, optionally scaled, discriminator scores by computing a Hadamard, e.g., entry-wise, product of the original partial derivatives the scaled discriminator scores. For example, a high value of a discriminator score may indicate a synthetic instance whereas a low value may indicate an actual instance. Thereby, a continuous mechanism may be provided in which updates to parts of the generative model are discouraged progressively more as their discriminator scores more strongly indicate an actual instance. Prior to or after computing the Hadamard product, optionally, various functions such as thresholding, non-linear functions, etc., may be applied to the discriminator output to control the way the training of the generator is affected, e.g., to make the training more or less eager to adapt the generative model.

Optionally, the loss function comprises a binary cross-entropy. Binary cross-entropy is frequently used to train GANs and is particularly convenient in this case because it provides a measure between 0 and 1 which combines well with various ways of updating the partial derivatives, in particular the Hadamard product. As is known in the art, the binary cross-entropy measure may include regularizers, etc.

Optionally, the partial derivative of the loss is updated as a function of the partial derivative and the discriminator score. Applying the same function to update respective partial derives based on respective discriminator scores may be convenient not only because of its simplicity but also because can allow to parallelize the updates to respective partial derivatives.

Optionally, the multiple partial discriminator scores for an input instance together form a discriminator instance. One or more discriminator instances may be output in a sensory-perceptible manner to a user. For example, as discussed above, there may be a systematic relation between discriminator scores and the parts of the input instance that they are determined for, for example, a spatial relationship in case of images. In such a case, a discriminator instance can for example be output, e.g., shown on a screen, alongside the input instance that it was determined for, e.g., both are shown together or one may be superimposed on the other. The discriminator instance may be scaled to make its size correspond to that of the input instance. Thus, effectively, a visualization (or other type of sensory perceptible output) of the GAN training process may be provided. As the training progresses, such visualizations may show how the discriminative model distinguishes between actual and synthetic instances, and in turn, how the generative model is trying to fool the discriminative model. Providing such visualizations over time thus provides model developers insight into the internals of the training mechanism in terms of the dynamic interaction between the generator and discriminator, allowing to correct the training process by adapting architectures of the generative and/or discriminative models, obtaining additional test data, etc. Discriminator instances have the added advantage that they are searchable, e.g., it is possible to look through discriminator instances to find parts where outputs generally indicate synthetic instances or generally indicate actual instances.

Optionally, partial discriminator scores for a part of the image determined during the training may be aggregated, e.g., to determine an amount of attention that the training process has spent on generating that part of the image. For example, the partial discriminator scores may be averaged to provide such a measure. As an example, in various settings, generated synthetic images may generally be quite similar to each other. If the discriminator scores indicate that a part of the image is an actual instance, then this may indicate that the training process is not a main causal factor in how this part appears in synthetic instances. This may provide a particularly good indication whether meaningful training has occurred that may not be visible well from the synthetic instances themselves.

Optionally, a discriminator instance may be output by mapping discriminator scores to parts of the input instance they are determined from and outputting the mapped discriminator scores, for example, an image may be shown of the size of the input image in which pixels leading to a high (or low) discriminator score are highlighted, in order to highlight parts of the image that the generator is good (or bad) at generating. Or, the input instance may be shown in which pixels of the original instance leading to a high (or low) discriminator score are eliminated, e.g., blacked out.

Optionally, an input of the user is obtained and, depending on the input of the user, the training is reset or continued. It is not uncommon during the training of GANs to get stuck in a situation where the generative model stops improving before it is able to generate convincing synthetic instances, e.g., because the generative model is focusing on parts of the synthetic instance for which it is too hard to fool the discriminative model. In practice, developer often use manual inspection of a batch of generated images at different stages of the training pipeline to judge whether it is meaningful to continue training or not. By showing the discriminator instance to the user, the user obtains better feedback on the internal state of the training process to base this decision on, allowing the user to better control the training process that is carried out.

Optionally, the generative model is used to generate one or more synthetic instances. One possible use of such generated synthetic instances may be as training and/or test data for a further machine learning model, e.g., a neural network or similar. The further machine learning model may then be trained using the one or more synthetic instances as test and/or training data. As an example, the further machine learning model may be a classification model or a regression model. In such a case, for example, labels may be obtained for the one or more synthetic instances, and the further machine learning model may be trained based on the one or more synthetic instances and the labels. Accordingly, the generative model, improved with the various features described herein, may be put to use to improve the training of the further machine learning model, e.g., an image classifier, and finally obtain more accurate model outputs, e.g., classifications. The further machine learning model does not need to be a classification or regression model: for example, the training dataset can be also be used for unsupervised learning, in which case obtaining labels may not be needed.

Various other applications of generative and/or discriminative models may be envisaged as well. In some embodiments, the generative and discriminative model may be used to determine an anomaly score for detecting anomalies, e.g., in multivariate time series of a network of sensors and actuators as in D. Li et al., "MAD-GAN: Multivariate Anomaly Detection for Time Series Data with Generative Adversarial Networks" (available at arxiv.org/abs/1901.04997 and incorporated herein by reference). In other embodiments, generative models may be used to for data completion. For example, in autonomous driving, various types of sensor data may be fused to establish a 360-degree view around a vehicle. In such cases where the field of view of different types of sensors is different, a generative model may be trained and used to synthesize missing sensor data outside of the field of view of a sensor based on the sensor data of another sensor.

It is noted that gradient updates may be used more generally to control the training process of the generator, e.g., in some or all iterations of training the generative model, the partial derivatives may be updated based not on discriminator scores of the discriminative model, but based on scores that are obtained otherwise, e.g., provided by a user, to control which specific portions or semantic parts of the synthetic instance the training of the generative model is to address at that point in time.

It will be appreciated by those skilled in the art that two or more of the above-mentioned embodiments, implementations, and/or optional aspects of the present invention may be combined in any way deemed useful.

Modifications and variations of any computer-implemented method and/or any computer readable medium, which correspond to the described modifications and variations of a corresponding system, can be carried out by a person skilled in the art on the basis of the present description.

BRIEF DESCRIPTION OF THE DRAWINGS

These and other aspects of the present invention will be apparent from and elucidated further with reference to the embodiments described by way of example in the following description and with reference to the figures.

It should be noted that the figures are purely diagrammatic and not drawn to scale. In the figures, elements which correspond to elements already described may have the same reference numerals.

DETAILED DESCRIPTION OF EXAMPLE EMBODIMENTS

Figure 1:
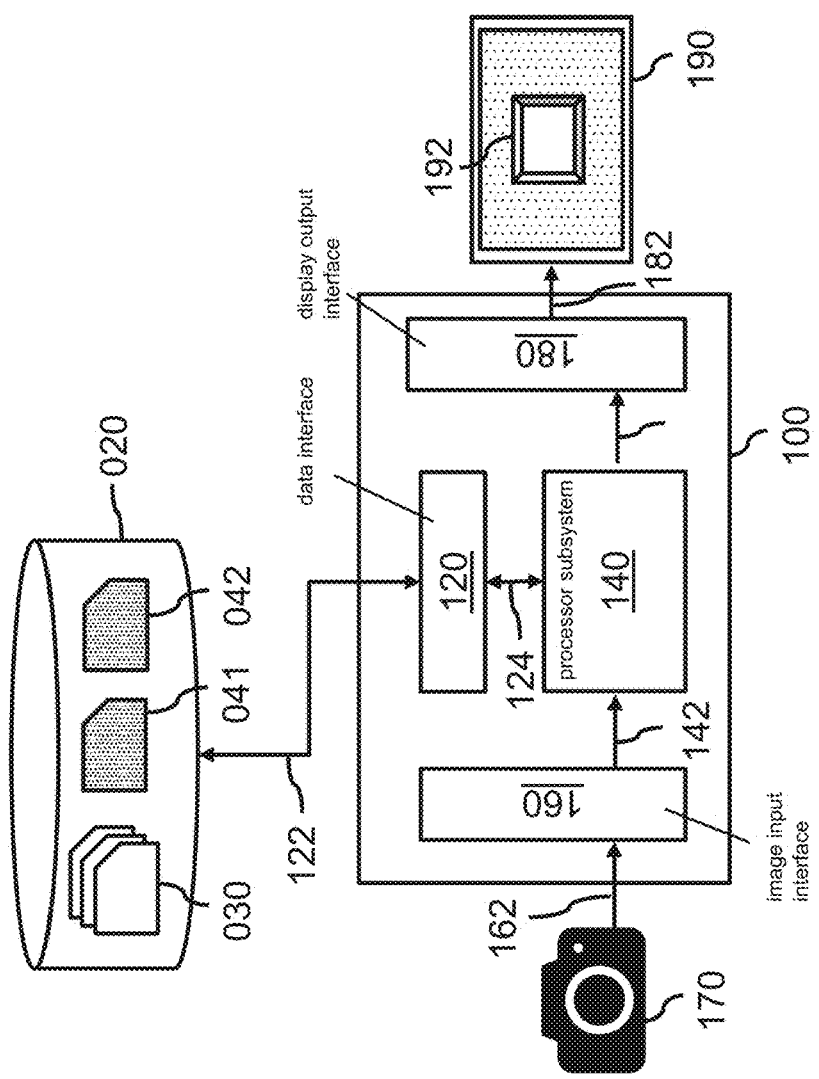
FIG. 1 shows a system for training a generative and discriminative model.

FIG. 1 shows an example system 100 for training a generative model and a discriminative model. The generative model may be configured to generate a synthetic instance from a latent feature vector and the discriminative model may be configured to determine multiple discriminator scores for multiple parts of an input instance. A discriminator score for a part of the input instance may indicate whether the part is from a synthetic instance or an actual instance. The system 100 may comprise a data interface 120 and a processor subsystem 140 which may internally communicate via data communication 124. Data interface 120 may be for accessing a set of actual instances 030 and parameters of the generative model 041 and of the discriminative model 042.

The processor subsystem 140 may be configured to, during operation of the system 100 and using the data interface 120, access data 030, 041, 042. For example, as shown in FIG. 1, the data interface 120 may provide access 122 to an external data storage 020 which may comprise said data 030, 041, 042. Alternatively, the data 030, 041, 042 may be accessed from an internal data storage which is part of the system 100. Alternatively, the data 030, 041, 042 may be received via a network from another entity. In general, the data interface 120 may take various forms, such as a network interface to a local or wide area network, e.g., the Internet, a storage interface to an internal or external data storage, etc. The data storage 020 may take any known and suitable form.

Processor subsystem 140 may be configured to, during operation of the system 100 and using the data interface 120, learn the parameters of the generative model 041 and of the discriminative model 042 by repeatedly training the discriminative model to decrease a first loss of distinguishing between the actual instances 030 and synthetic instances generated by the generative model and training the generative model to decrease a second loss of generating synthetic instances which the discriminative model indicates to be actual instances. The generative model may be configured to generate a synthetic instance from a latent feature vector by generating an intermediate representation from the latent feature vector and generating the synthetic instance from the intermediate representation.

Processor subsystem 140 may be configured to train the generative model by backpropagating the second loss for a synthetic instance generated from a latent feature vector. The backpropagation may comprise determining multiple discriminator scores for the multiple parts of the synthetic instance using the discriminative model. The backpropagation may further comprise computing a gradient of the loss with respect to the intermediate representation. The gradient may comprise partial derivatives of the loss with respect to entries of the intermediate representation. The backpropagation may also comprise updating a partial derivative of the loss with respect to an entry of the intermediate representation based on a discriminator score for a part of the synthetic instance. The part of the synthetic instance may be generated based at least in part on the entry of the intermediate representation. The partial derivative may be decreased in value if the discriminator score indicates an actual instance. The backpropagation may further comprise further backpropagating the loss based on the updated gradient.

As an optional component, the system 100 may comprise an image input interface 160 or any other type of input interface for obtaining sensor data from a sensor, such as a camera 170. The sensor data may be part of the set of actual instances 030. For example, the camera may be configured to capture image data 162, processor subsystem 140 being configured to obtain image data 162 obtained via input interface 160 and store it as part of set of actual instances 030. The input interface may be configured for various types of sensor signals, e.g., video signals, radar/LiDAR signals, ultrasonic signals, etc.

As an optional component, the system 100 may comprise a display output interface 180 or any other type of output interface for outputting one or more discriminator instances to a rendering device, such as a display 180. For example, the display output interface 180 may generate display data 182 for the display 190 which causes the display 190 to render the one or more discriminator instances in a sensory perceptible manner, e.g., as an on-screen visualisation 192.

Figure 3:
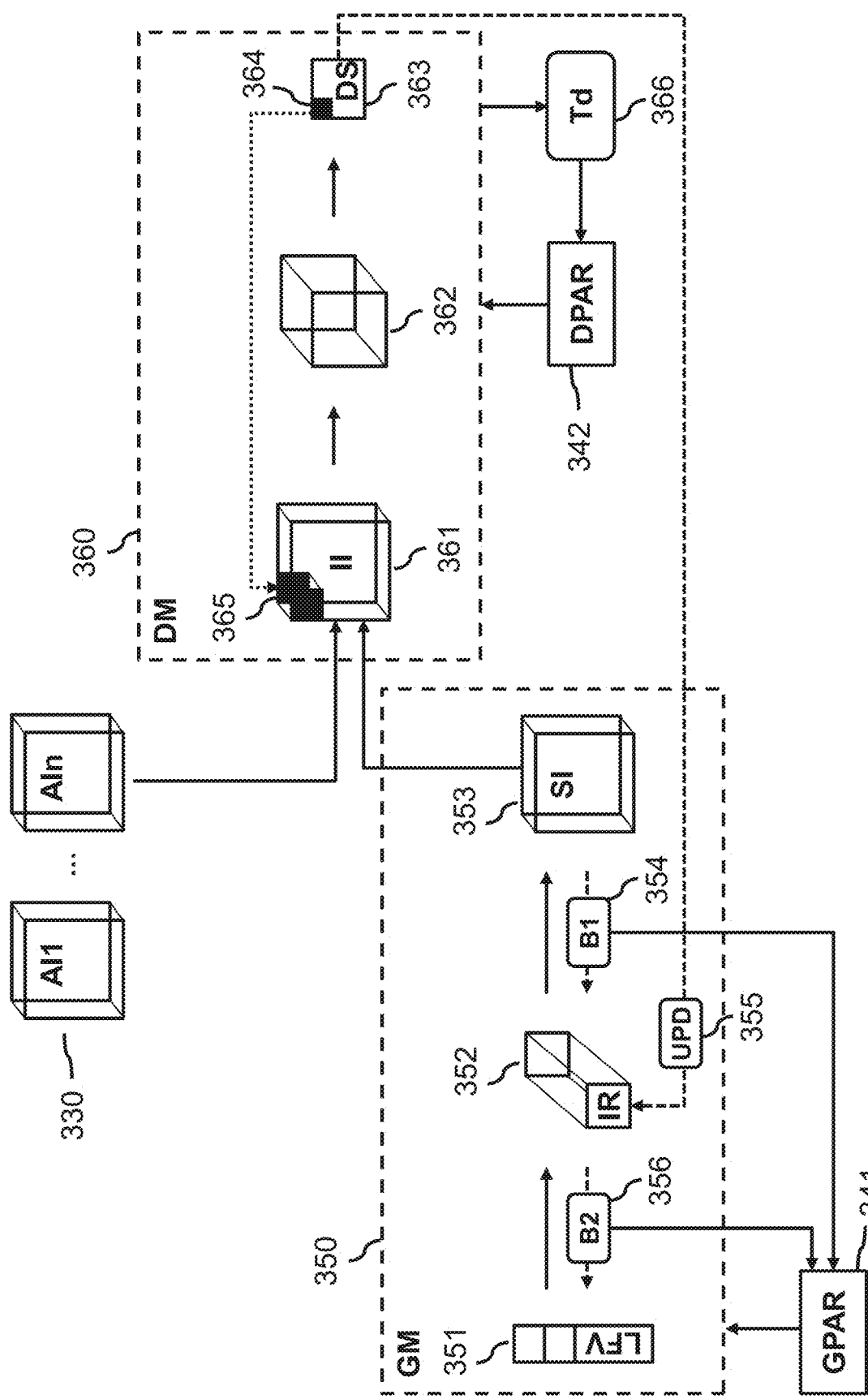
FIG. 3 shows a detailed example of how a generative model and a discriminative model may be trained and used.

Various details and aspects of the operation of the system 100 will be further elucidated with reference to FIG. 3, including optional aspects thereof.

In general, the system 100 may be embodied as, or in, a single device or apparatus, such as a workstation, e.g., laptop or desktop-based, or a server. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA) and/or a Graphics Processing Unit (GPU). In general, each functional unit of the system may be implemented in the form of a circuit. It is noted that the system 100 may also be implemented in a distributed manner, e.g., involving different devices or apparatuses, such as distributed servers, e.g., in the form of cloud computing.

Figure 2:
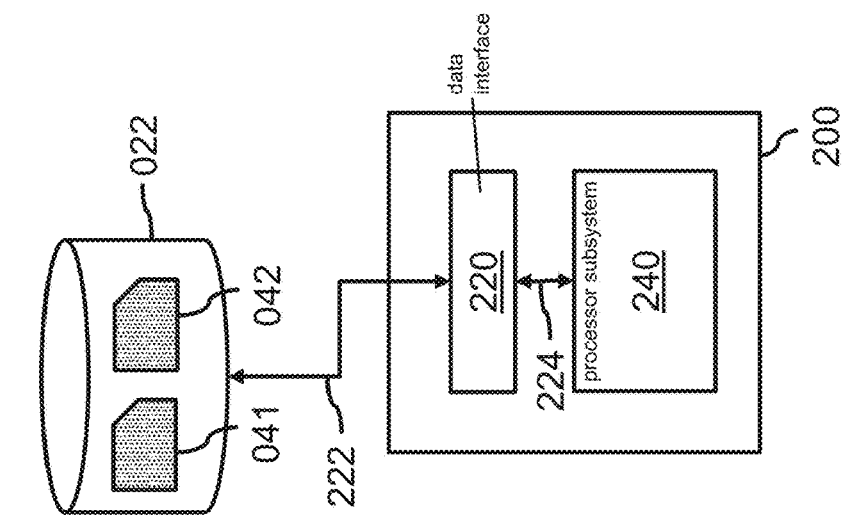
FIG. 2 shows a system for using a generative and/or discriminative model.

FIG. 2 shows a system 200 for applying a generative model and/or a discriminative model, e.g., as trained by system 100. The system 200 may comprise a data interface 220 and a processor subsystem 240 which may internally communicate via data communication 224. Data interface 220 may be for accessing parameters 041 of the generative model and/or parameters 042 of the discriminative model. Similarly to system 100, processor subsystem 240 of system 200 may be configured to, during operation of the system 200 and using the data interface 220, access parameters 041 and/or 042, e.g., via access 222 to an external data storage 022 or otherwise. Analogously to system 100, system 200 may be embodied as, or in, a single device or apparatus or may be implemented in a distributed manner.

Processor subsystem 240 may be configured to, during operation of the system, apply the generative model and/or the discriminative model. For example, processor subsystem 240 may generate one or more synthetic instances using the generative model; obtain labels for the one or more synthetic instances; and train a classification model based on the one or more synthetic instances and the labels.

As a concrete example, system 200 may be comprised in an automotive perception system, e.g., as a subcomponent of an autonomous vehicle. For example, the autonomous vehicle may be controlled based at least in part on data produced by the generative model. For example, the generative model may be used to synthesize missing sensor data outside of the field of view of an image sensor of the system. Based on the sensor data and the synthesized data, an electric motor may be controlled. In general, such a data synthesis system may be (part of) a physical entity such as a vehicle, robot, etc., or a connected or distributed system of physical entities, e.g., a lighting system, or any other type of physical system, e.g., a building.

Various details and aspects of the operation of the system 200 will be further elucidated with reference to FIG. 3, including optional aspects thereof.

FIG. 3 shows a detailed yet non-limiting example of a generative model and a discriminative model may be trained and used.

Shown in this example is a generative model GM, 350 parametrized by a set of parameters GPAR, 341. Generative model GM may be configured to generate a synthetic instance SI, 353 from a latent feature vector LFV, 351. In this particular example, synthetic instance SI may be a synthetic image, for example, a M×N-sized image represented by M×N×c real numbers where c is the number of channels of the image, e.g., 1 for greyscale and 3 for RGB, etc. It is noted that various other types of synthetic instances SI are possible as well, e.g., audio data such as spectral ranges, etc.

Generative model GM may generate synthetic instance SI from latent feature vector LFV by generating an intermediate representation IR, 352, from latent feature vector LFV and generating synthetic instance SI from the intermediate representation IR. As also discussed elsewhere, various types of generative models may use intermediate representations, e.g., Gaussian processes, Markov models, etc. In this case, generative model GM may be a neural network, and more specifically, a convolutional neural network. Parameters GPAR comprise weights of the neural network. As is known in the art per se, a convolutional neural network may comprise one or more convolutional layers. Such convolutional layers typically provide as output volumes of size $M_i \times N_i \times d_i$, where $d_i$ is a number of filters in the layer and $M_i \times N_i$ are dimensions of outputs of filters which are typically applied convolutionally to respective outputs of the previous convolutional layer, optionally with various other layers, e.g. pooling layers or ReLU layers, in between. Dimensions $M_i \times N_i$ typically have the same proportions as synthetic image SI to be generated, although this is not necessary.

In this case, intermediate representation IR is an output of one of the convolutional layers. As such, it is also shown in this figure by a $M_i \times N_i \times d_i$-sized volume. Because of the convolutional nature of convolutional neural network GM, in this example, intermediate representation IR may be seen to comprise $d_i$ times a $M_i \times N_i \times 1$-sized volume of data. Given coordinates (i,j), the set of entries (i,j,k) of intermediate representation IR typically all affect the same subregion of the synthetic instance SI. Due to the convolutional nature, this subregion may correspond approximately to a region of the synthetic instance SI obtained by scaling the point (i,j) to a region of the synthetic instance.

In general, there can be any number $L_b$ of convolutional layers in between latent feature vector LFV and intermediate representation IR and $L_a$ in between intermediate representation IR and synthetic instance SI. For instance, the total number of layers $L_b + L_a$ may be at most or at least 10, at most or at least 20, or at most or at least 100. The overall number of parameters of the generative model may be at most or at least 10000, at most or at least 1000000, or at most or at least 10000000, etc. It may be preferred to have $L_a \geq L_b$, e.g., $L_a = L_b = 5$, e.g., to ensure that a sufficiently large part of generative model GM benefits from feedback provided by the discriminative model as discussed below.

More generally, generative model GM may sample from a k-dimensional latent space to a tensor matching the dimensions of the image to be generated. Along the way, an intermediate representation IR may be generated whose spatial dimensions match the output of the discriminative model, as discussed below:

$$G: \mathbb{R}_k \mapsto \mathbb{R}^{m \times n \times j} \mapsto \mathbb{R}^{M \times N \times c},$$

where generally, m<M and n<N, for example, $(m,n,j)=(M_i, N_i, d_i)$ in the convolutional neural network example above.

Apart from generative model GM generating synthetic instances SI, also shown are actual instances AI1, . . . , Ain, 330, and a discriminative model DM, 360, parametrized by a set of parameters DPAR, 342. Discriminative model DM may be for determining whether a given input instance II, 361, is a synthetic instance SI or an actual instance AIi. Specifically, discriminative model DM may be configured to determine multiple discriminator scores DS, 363, for multiple parts of input instance II, e.g., a discriminator score 364 for a part 365 of the input instance as shown in the figure. Such a discriminator score, e.g., discriminator score 364, may indicate whether such a part, e.g., part 365, is from a synthetic instance SI or an actual instance, e.g., with 0 indicating an actual instance and 1 indicating a synthetic instance. As illustrated by score 364 and part 365, there may be a spatial relationship or other type of systematic relationship between scores and parts they are determined for, e.g., discriminator scores 364 are here shown in a grid where top-left score 364 is determined for top-left part 365 of input image II.

Similarly to generative model GM, also discriminative model DM in this example may be a neural network, specifically a convolutional neural network comprising one or more convolutional layers. For illustrative examples, shown is an output 362 of an intermediate convolutional layer of the neural network. Also discriminator scores DS may be computed by a convolutional layer of the neural network DM based on respective receptive fields in the synthetic instance. This may result in the spatial relationship between scores and parts discussed above. In order for respective discriminator scores DS to be affected by reasonable parts of the input instance, the number of layers of the discriminative model DM may be reasonably large, e.g., at least 4 or at least 8 layers. For example, for a 128×128 input image, discriminative model DM may comprise 5 or 6 layers; generally, the number of layers may be at most or at least 10, at most or at least 100, etc. The overall number of parameters of the discriminative model may be at most or at least 10000, at most or at least 100000, at most or at least 10000000, etc.

As a concrete example, discriminative model DM may be designed according to a patch discriminator design as disclosed for example in "Image-to-Image Translation with Conditional Adversarial Networks" by P. Isola et al. In this and other designs, discriminative model DM may take an input image II and output a smaller flattened image, e.g.:

$$DM: \mathbb{R}^{M \times N \times c} \mapsto \mathbb{R}^{m \times n \times 1}.$$

Again, generally m'≤M and n'<N. Output dimensions (m',n') may be equal to dimensions (m,n) of the intermediate representation IR of the generative model GM, but this is not necessary, e.g., dimensions (m',n') and (m,n) may correspond to each other by scaling as discussed in more detail below.

So far, it has been discussed how the discriminative model DM and generative model GM may be applied. The resulting outputs of the models can be put to various uses. For example, considering the discriminator scores 364 together as a discriminator instance, one or more such discriminator instances may be output in a sensory-perceptible manner to a user, e.g., when applying a convolutional neural network DM to an input image II, the output DS may itself be regarded as a discriminator image that can be output, e.g., shown on a screen. Such an output may be useful as a debugging output to let a user control the training of generative model GM, but also more generally, e.g., for anomaly detection as discussed in D. Li et al., "MAD-GAN: Multivariate Anomaly Detection for Time Series Data with Generative Adversarial Networks". Specifically, discriminator scores may be output by mapping them to parts of the input instance they are determined from and outputting the mapped discriminator scores, and/or may be overlaid on the original input instance II. For example, starting from an input image, pixels affecting a discriminator score may be adapted based on the score, e.g., darkened or lightened.

Generative model GM may also be used to generate one or more synthetic instances SI for which labels may be obtained, e.g., by a manual annotation, after which a classification model may be trained (not shown) based on the one or more synthetic instances and the labels. The synthetic instances may also be used, e.g., without such labels, as training input to perform unsupervised learning.

Moving on to training of the discriminative model DM and generative model GM. Parameters GPAR of the generative model and parameters DPAR of the discriminative model may be learned by repeatedly training the discriminative model DM to decrease a first loss of distinguishing between the actual instances AIi and synthetic instances SI generated by the generative model GM and training the generative model GM to decrease a second loss of generating synthetic instances SI which the discriminative model DM indicates to be actual instances. For example, a loop of the training process may comprise one or more training iterations of the discriminative model DM, followed by one or more training iterations of the generative model GM. For example, the high-level training approach of "Generative Adversarial Networks" by I. Goodfellow et al. may be used. Typically, training is performed using stochastic approaches such as stochastic gradient descent, e.g., using the Adam optimizer. Training may be performed on an instance-by-instance basis or in batches, e.g., of at most or at least 64 or at most or at least 256 instances. As is known, such optimization methods may be heuristic and/or arrive at a local optimum.

The training of the discriminative model DM is shown as operation Td, 366, in the figure. In this example, discriminative model DM may be trained by computing binary cross-entropy losses 364 independently to obtain the m×n discriminator outputs 364 and averaging the result to determine an overall loss to be minimized. As ground truth, for example, a batch of m×n matrices of all ones may be used in case of a current training batch of synthetic instances, or a batch of m×n matrices of all zeros may be used in case of a current batch of actual instances AIi. Accordingly, each of the m×n discriminator outputs may intuitively be responsible for recognizing whether the part of the input instance II in its receptive field in the input is an actual or synthetic instance. However, various other was of training discriminative model DM with respect to discriminator outputs 364, and thereby iteratively determining set of parameters DPAR, will be apparent. In contrast to normal GANs, typically m>1 and/or n>1 so that multiple discriminator outputs are determined.

As shown in the figure, training the generative model GM may be performed by backpropagating a second loss, e.g., of generating synthetic instances which the discriminative model indicates to be actual instances. In other words, the loss, e.g., a binary cross-entropy loss, may penalize generating instances that are easily recognizable as being synthetic by the discriminative model DM. The loss may be backpropagated for one or more synthetic instances SI generated from latent feature vectors LFV. Thus, set of parameters GPAR may be iteratively updated to decrease such a loss. The backpropagation may comprise computing, in a backpropagation operation B1, 354, a gradient of the loss with respect to intermediate representation IR. Such backpropagation may be performed using conventional techniques as also discussed above. The gradient comprises partial derivatives of the loss with respect to entries of the intermediate representation IR.

Interestingly, the backpropagating shown in the figure may include an updating operation UPD, 355. Update UPD may be performed on the computed gradient for a synthetic instance SI with respect to intermediate representation IR based on discriminator scores DS determined for synthetic instance SI by the discriminative model DM. Thus, the discriminator scores DS may be used as a feedback signal to update the gradient. In particular, a partial derivative of the loss with respect to an entry of intermediate representation IR may be updated based on a discriminator score for a part of synthetic instance SI. The part of the synthetic instance SI may be selected such that it is generated based at least in part on the entry of the intermediate representation IR. In other words, partial derivatives of the loss may be updated based on discriminator scores for parts of the synthetic instance they affect, e.g., a discriminator score may in effect provide feedback on the quality of the part of the synthetic instances generated at least in part based on the entry of the intermediate representation. As discussed in more detail elsewhere, the partial derivative may be decreased in value if the discriminator score indicates an actual instance; in other words, if the discriminator score indicates an actual instance, less backpropagation may be performed than if the discriminator score indicates a synthetic instance.

Selecting which partial derivatives to update based on which discriminator scores DS may be performed in various ways. For example, for some or all discriminator scores DS, one or more corresponding entries of intermediate representation IR may be updated. It is possible to update all entries of the intermediate representation IR that affect the discriminator score DS, but it is often beneficial to select only those entries that most strongly, e.g., most directly, affect the discriminator score DS. For instance, in the case of convolutional neural networks, entries of the intermediate representation IR may correspond to discriminator scores DS by being corresponding sub-volumes, e.g., corresponding image regions. In such convolutional neural networks, due to their convolutional nature, a sub-volume most strongly affects corresponding sub-volumes of next layers of the convolutional network, for example spatially in the case of images, but may also less strongly affect adjacent sub-volumes. In such cases, to improve the quality of the feedback signal, it may be beneficial to only update those parts of the intermediate representations IR that more strongly affect the part of the synthetic instance for which a discriminator score DS is determined, e.g., a corresponding sub-volume.

In some embodiments, for each discriminator score, exactly one corresponding entry of the intermediate representation may be updated. However, this is not essential, e.g., a discriminator score DS may be used to update multiple entries of the intermediate representation IR and/or an entry of the intermediate representation IR may be updated, e.g., in multiple updating operations, based on multiple discriminator scores DS. For example, receptive fields of multiple discriminator scores DS in the synthetic instance SI may overlap, which may lead to different entries of the intermediate representation IR affecting the same discriminator score DS.

As a concrete example, the case is now discussed in which discriminative model DM and/or generative model GM comprise a convolutional neural network. As discussed above, such networks may comprise multiple intermediate representations representing volumes of data of respective sizes $M_i \times N_i \times d_i$, where $d_i$ is a number of applied filters and $M_i \times N_i$ are dimensions of an output of a filter. Starting from a M×N×c-sized input image, for example, discriminative model DM may use one or more convolutional layers with respective intermediate representations to end up with a discriminator instance, e.g. a set of discriminator scores DS forming a first volume of data, e.g., a layer of size m'×n' representing a m'×n'-sized volume of data. Similarly, generative model GM may, starting from a latent feature vector of size k, use multiple intermediate representations to end up with a synthetic image of size M×N×c. In particular, intermediate representation 362 may be computed in a layer of network GM as one of more respective second volumes of data, e.g., a $M_i \times N_i \times d_i$-sized layer comprising a number $d_i$ of $M_i \times N_i$-sized second volumes of data. Such volumes of data may also occur in other types of models apart from convolutional neural networks, but for ease of explanation, convolutional neural networks are used here as an example.

In cases where the intermediate representation IR and the discriminator scores DS form respective volumes of data, entries of intermediate representation IR may be updated based on corresponding discriminator scores DS by scaling discriminator scores DS from the first volume to the respective second volumes, and updating respective partial derivatives based on the respective scaled discriminator scores. The scaling may be an upscaling or a downscaling, as appropriate. In many cases the respective second volumes may each have the same dimension, in which case a single scaling may suffice, but respective scaling with respect to respective second volumes may also be performed. If the first and second volumes have the same dimension, of course, the scaling may be skipped.

The case when the sizes of the first and second volumes do not match exactly is now illustrated. For example, discriminative model DM may start with a 100×100×3-sized input instance, e.g., representing an RGB image with size 100×100. After one or more operations, an intermediate representation may be determined with size 10×10×20, e.g., corresponding to 20 convolutional neural network filters, each of size 10×10. In order to determine discriminator outputs DS, discriminative model DM may apply an operation, e.g. 2D convolution with a filter window size of 1, to produce a volume of discriminator scores DS, e.g., of size 10×10×1. Accordingly, each of these discriminator scores may have a respective receptive field of a certain size in the input. Intermediate representation IR of generative mode GM may, e.g., have a 10×10×N volume. In this case scaling may be skipped and each entry (i,j,k) of intermediate representation IR may be updated based on corresponding entry (i,j) of discriminator scores DS. However, it is also possible that the generative model GM generates an intermediate representation IR of a different size, e.g., of size 5×5×N. In such case, the updating of the gradient of the loss may comprise scaling the first volume, in this case of size 10×10×1, to the size of the second volume, in this case 5×5×1, and update each entry (i,j,k) of intermediate representation IR based on corresponding entry (i,j) of the rescaled volume.

With respect to how the partial derivative is updated, as noted above, the partial derivate may be decreased in value if the discriminator score DS indicates an actual instance, thereby achieving stronger feedback for synthetic-looking instance than for actual-looking instances. This may be done by updating the partial derivative of the loss as a function of the partial derivative itself and the discriminator score, possibly after a rescaling.

As an example, the discriminative model DM may be trained to provide discriminator scores ranging from 0 to 1 indicating whether parts of instance 365 look like actual instances or synthetic instances, e.g., by training discriminative model DM using a binary cross-entropy loss function or similar. For example, the value 0 may indicate an actual instance and the value 1 may indicate a synthetic instance. In such cases the discriminator scores DS may be regarded to represent an extent to which the gradient of the generative model GM may be modulated at that particular location. For example, the generative model GM may be discouraged from changing parts of the synthetic instance SI where the discriminative model DM is, e.g., not sure that the input is fake, and focus on minimizing the GAN loss by working on locations where the discriminative model is more certain they are synthetic.

In some particularly appealing embodiments, respective partial derivatives are updated based on respective, optionally scaled, discriminator scores by computing a Hadamard, e.g., element-wise, product of the original partial derivatives and the (scaled) discriminator scores. For example, a Hadamard (element-wise) product between m×n×1-sized discriminator scores DS and m×n×j-sized volume of gradients resulting from intermediate representation IR may be computed. Intuitively, if a discriminator score is 1 at a given location, e.g., indicating a synthetic instance, the gradient may flow backwards to reconfigure parameters GPAR, such as neural network weights, that may change the output of the generative model GM at this location. If the discriminator score is 0, e.g., the discriminative model believes sample is real, then parameter GPAR may remain unchanged.

Instead of or in addition to the Hadamard product, various other functions may be used to update the partial derivatives. Adapting the function may allow to control how eager to make the generative model GM based on output predictions of the discriminative model DM. For example, a threshold may be applied, e.g., given outputs of the discriminative model represented as floating point numbers between 0 and 1, a threshold at 0.5 or similar may be applied to ensure that only values below the threshold result in an updated partial derivative. It is noted that controlling the eagerness may be particularly relevant given that there is a difference between modulating based on discriminative scores indicating that the discriminative model is sure it sees an actual instance versus discriminative scores indicating that the model is not sure it sees a synthetic instance. In particular, it is noted in this context that the theoretical optimum for a discriminator in a GAN may not be that it can perfectly tell real images from fake, but, e.g., that it is 50% sure that an input image is real or fake.

After update UPD, the loss may be further backpropagated, in operation B2, 356, based on the updated gradient. For example, this may be performed according to the high-level training approach of "Generative Adversarial Networks" by I. Goodfellow et al. Regularization and/or custom GAN loss functions may be applied as is conventional.

Interestingly, in some embodiments, during the training, one or more discriminator instances are presented to a user, e.g., shown on screen. An input of the user may be obtained and, depending on the input of the user, the training may be reset or continued. In particularly, a discriminator instance may be shown alongside or superimposed on the instance it was determined for. Interestingly, a discriminator instance DS may highlight not just which parts of generated synthetic instances SI are considered convincing by the discriminative model DM, but also, due to the feedback mechanism of updating the partial derivatives, on which parts of the synthetic instance SI the training process is currently focusing. Accordingly, particularly effective feedback about the internal workings of the training process may be provided to the user who can adjust the training process accordingly, e.g., by stopping training if insufficient progress is made. For example, multiple training processes can active at the same time, with the user selecting which training processes to continue. However, the feedback can be used to various other ends as well, e.g., to inform the generation of additional training data, etc. Thereby, an overall more efficient training process may be achieved.

Figure 4:
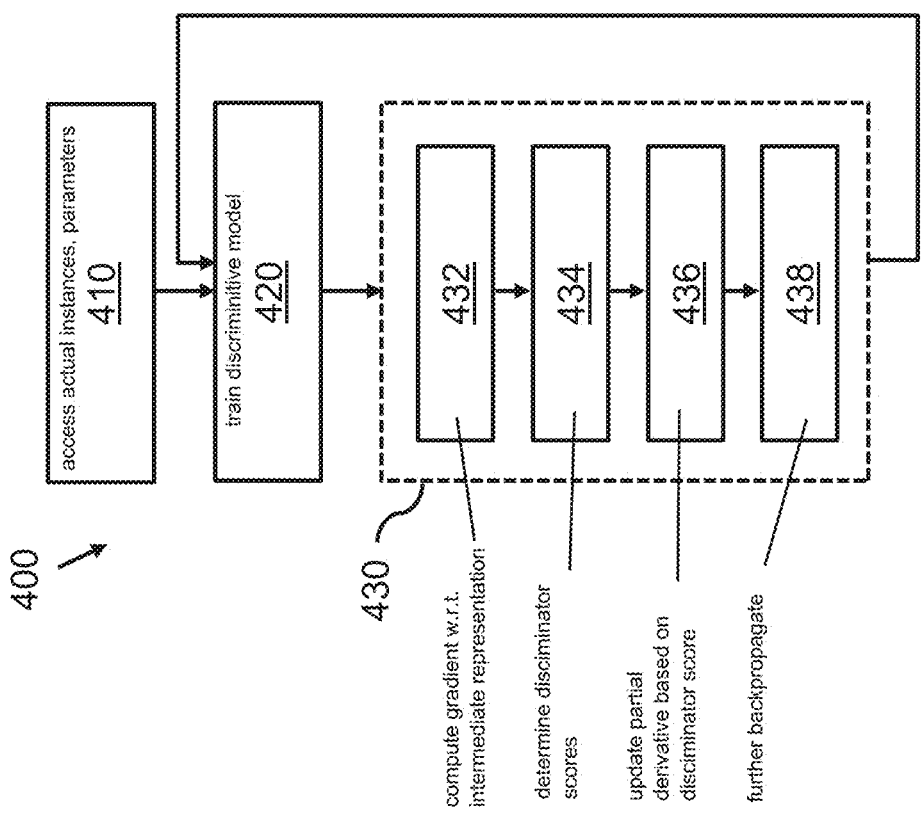
FIG. 4 shows a computer-implemented method of training a generative model and a discriminative model.

FIG. 4 shows a block-diagram of computer-implemented method 400 of training a generative model and a discriminative model. The generative model may be configured to generate a synthetic instance from a latent feature vector. The discriminative model may be configured to determine multiple discriminator scores for multiple parts of an input instance. A discriminator score for a part of the input instance may indicate whether the part is from a synthetic instance or an actual instance. The method 400 may correspond to an operation of the system 100 of FIG. 1. However, this is not a limitation, in that the method 400 may also be performed using another system, apparatus or device.

The method 400 may comprise, in an operation titled "ACCESSING ACTUAL INSTANCES, PARAMETERS", accessing 410 a set of actual instances and parameters of the generative model and of the discriminative model. The method 400 may further comprise learning the parameters of the generative model and the discriminative model. The learning may be performed by repeatedly, in an operation titled "TRAINING DISCRIMINATIVE MODEL", training the discriminative model 420 to decrease a first loss of distinguishing between the actual instances and synthetic instances generated by the generative model; and, in an operation titled "TRAINING GENERATIVE MODEL", training the generative model 430 to decrease a second loss of generating synthetic instances which the discriminative model indicates to be actual instances. The generative model may be configured to generate a synthetic instance from a latent feature vector by generating an intermediate representation from the latent feature vector and generating the synthetic instance from the intermediate representation.

The training of the generative model 430 may comprises backpropagating the second loss for a synthetic instance generated from a latent feature vector. The backpropagation may comprise, in an operation titled "COMPUTING GRADIENT W.R.T. INTERMEDIATE REPRESENTATION", computing 432 a gradient of the loss with respect to the intermediate representation. The gradient may comprise partial derivatives of the loss with respect to entries of the intermediate representation. The backpropagation may further comprise, in an operation titled "DETERMINING DISCRIMINATOR SCORES", determining 434 multiple discriminator scores for the multiple parts of the synthetic instance using the discriminative model. The backpropagation may also comprise, in an operation titled "UPDATING PARTIAL DERIVATIVE BASED IN DISCRIMINATOR SCORE", updating 436 a partial derivative of the loss with respect to an entry of the intermediate representation based on a discriminator score for a part of the synthetic instance. The part of the synthetic instance may be generated based at least in part on the entry of the intermediate representation. The partial derivative may be decreased in value if the discriminator score indicates an actual instance. The backpropagation may further comprise, in an operation titled "FURTHER BACKPROPAGATING", further backpropagating 438 the loss based on the updated gradient of adapting a base classifier to one or more novel classes.

Figure 5:
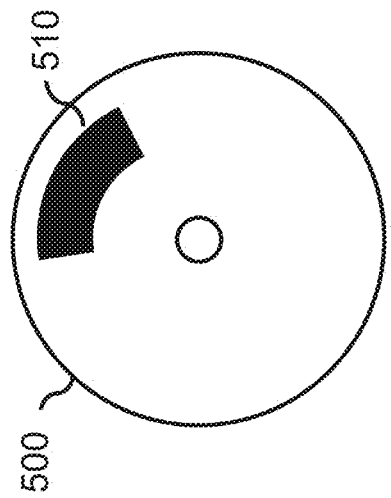
FIG. 5 shows a computer-readable medium comprising data.

It will be appreciated that, in general, the operations of method 400 of FIG. 4 may be performed in any suitable order, e.g., consecutively, simultaneously, or a combination thereof, subject to, where applicable, a particular order being necessitated, e.g., by input/output relations. The method(s) may be implemented on a computer as a computer implemented method, as dedicated hardware, or as a combination of both. As also illustrated in FIG. 5, instructions for the computer, e.g., executable code, may be stored on a computer readable medium 500, e.g., in the form of a series 510 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 5 shows an optical disc 500. Alternatively, the computer readable medium 500 may comprise transitory or non-transitory data 510 representing parameters of a generative model and/or of a discriminative model as described elsewhere in this specification.

Examples, embodiments or optional features, whether indicated as non-limiting or not, are not to be understood as limiting the present invention.

It should be noted that the above-mentioned example embodiments illustrate rather than limit the present invention, and that those skilled in the art will be able to design many alternative embodiments without departing from the scope of the present invention. Herein, use of the verb "comprise" and its conjugations does not exclude the presence of elements or stages other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In the device including several elements, several of these means elements be embodied by one and the same item of hardware. The mere fact that certain measures are described in mutually separately does not indicate that a combination of these measures cannot be used to advantage.

What is claimed is:

1. A system for training a generative model and a discriminative model, wherein the generative model is configured to generate a synthetic instance from a latent feature vector, and the discriminative model is configured to determine multiple discriminator scores for multiple parts of an input instance, a discriminator score for a part of the input instance indicating whether the part is from a synthetic instance or an actual instance, the system comprising:
  a data interface configured to access a set of actual instances and parameters of the generative model and of the discriminative model; and
  a processor configured to learn the parameters of the generative model and the discriminative model by repeatedly training the discriminative model to decrease a first loss of distinguishing between the actual instances and synthetic instances generated by the generative model and training the generative model to decrease a second loss of generating synthetic instances which the discriminative model indicates to be actual instances;
  wherein:
    the generative model is configured to generate a synthetic instance from a latent feature vector by generating an intermediate representation from the latent feature vector and generating the synthetic instance from the intermediate representation; and the processor is configured to train the generative model by backpropagating the second loss for a synthetic instance generated from a latent feature vector by:

determining multiple discriminator scores for multiple parts of the synthetic instance using the discriminative model;

computing a gradient of the loss with respect to the intermediate representation, the gradient including partial derivatives of the loss with respect to entries of the intermediate representation;

updating a gradient of the loss by updating a partial derivative of the loss with respect to an entry of the intermediate representation based on a discriminator score for a part of the synthetic instance, wherein the part of the synthetic instance is generated based at least in part on the entry of the intermediate representation, and wherein the partial derivative is decreased in value if the discriminator score indicates an actual instance; and further backpropagating the loss based on the updated gradient.

2. The system of claim 1, wherein the generative model is configured to generate a synthetic image and the discriminator model is configured to determine discriminator scores for parts of an input image.

3. The system of claim 1, wherein the generative model includes a neural network, the processor being configured to compute the synthetic instance from the intermediate representation by one or more convolutional layers of the neural network.

4. The system of claim 1, wherein the discriminative model includes a neural network, the processor being configured to compute respective discriminator scores by a convolutional layer of the neural network based on respective receptive fields in the synthetic instance.

5. The system of claim 1, wherein the discriminator scores determined by the discriminative model form a first volume of data and the intermediate representation generated by the generative model forms respective second volumes of data, the processor being configured to update the gradient of the loss by scaling the discriminator scores from the first volume to the respective second volumes and updating respective partial derivatives based on the respective scaled discriminator scores.

6. The system of claim 1, wherein the loss includes a binary cross-entropy.

7. The system of claim 1, wherein the processor is configured to update the partial derivative of the loss as a function of the partial derivative and the discriminator score.

8. The system of claim 1, wherein the multiple discriminator scores for an input instance together form a discriminator instance, and where the system further comprises an output interface configured to output one or more discriminator instances in a sensory-perceptible manner to a user.

9. The system of claim 1, wherein the processor is further configured to obtain an input of the user and, depending on the input of the user, to reset or continue the training.

10. The system of claim 3, wherein the processor is configured to compute the intermediate representation in a layer of the neural network, a number of layers preceding said layer being greater than or equal to a number of layers succeeding said layer.

11. The system of claim 5, wherein the processor is configured to update respective partial derivatives based on respective scaled discriminator scores by computing a Hadamard product of the original partial derivatives and the scaled discriminator scores.

12. The system of claim 8, wherein the processor is configured to output the discriminator instance by mapping discriminator scores to parts of the input instance they are determined from and outputting the mapped discriminator scores.

13. A computer-implemented method of training a generative model and a discriminative model, wherein the generative model is configured to generate a synthetic instance from a latent feature vector and the discriminative model is configured to determine multiple discriminator scores for multiple parts of an input instance, a discriminator score for a part of the input instance indicating whether the part is from a synthetic instance or an actual instance, the method comprising the following steps:

accessing a set of actual instances and parameters of the generative model and of the discriminative model; and learning parameters of the generative model and the discriminative model by repeatedly training the discriminative model to decrease a first loss of distinguishing between the actual instances and synthetic instances generated by the generative model and training the generative model to decrease a second loss of generating synthetic instances which the discriminative model indicates to be actual instances, wherein: the generative model is configured to generate a synthetic instance from a latent feature vector by generating an intermediate representation from the latent feature vector and generating the synthetic instance from the intermediate representation; and training the generative model by backpropagating the second loss for a synthetic instance generated from a latent feature vector by:

computing a gradient of the loss with respect to the intermediate representation, the gradient including partial derivatives of the loss with respect to entries of the intermediate representation;

determining multiple discriminator scores for the multiple parts of the synthetic instance using the discriminative model;

updating the gradient of the loss by updating a partial derivative of the loss with respect to an entry of the intermediate representation based on a discriminator score for a part of the synthetic instance, wherein the part of the synthetic instance is generated based at least in part on the entry of the intermediate representation, and wherein the partial derivative is decreased in value if the discriminator score indicates an actual instance; and further backpropagating the loss based on the updated gradient.

14. The method of claim 13, further comprising generating one or more synthetic instances using the generative model.

15. The method of claim 14, further comprising training a further machine learning model using the one or more synthetic instances as test and/or training data.

16. A non-transitory computer-readable medium on which is data representing instructions which, when executed by a processor system, cause the processor system to perform the computer-implemented method of training a generative model and a discriminative model, wherein the generative model is configured to generate a synthetic instance from a latent feature vector and the discriminative model is configured to determine multiple discriminator scores for multiple parts of an input instance, a discriminator score for a part of the input instance indicating whether the part is from a synthetic instance or an actual instance, the method comprising the following steps:

accessing a set of actual instances and parameters of the generative model and of the discriminative model;

learning parameters of the generative model and the discriminative model by repeatedly training the discriminative model to decrease a first loss of distinguishing between the actual instances and synthetic instances generated by the generative model and training the generative model to decrease a second loss of generating synthetic instances which the discriminative model indicates to be actual instances, wherein: the generative model is configured to generate a synthetic instance from a latent feature vector by generating an intermediate representation from the latent feature vector and generating the synthetic instance from the intermediate representation; and training the generative model by backpropagating the second loss for a synthetic instance generated from a latent feature vector by:

computing a gradient of the loss with respect to the intermediate representation, the gradient including partial derivatives of the loss with respect to entries of the intermediate representation;

determining multiple discriminator scores for the multiple parts of the synthetic instance using the discriminative model;

updating the gradient of the loss by updating a partial derivative of the loss with respect to an entry of the intermediate representation based on a discriminator score for a part of the synthetic instance, wherein the part of the synthetic instance is generated based at least in part on the entry of the intermediate representation, and wherein the partial derivative is decreased in value if the discriminator score indicates an actual instance; and further backpropagating the loss based on the updated gradient.

\* \* \* \* \*

UNITED STATES PATENT AND TRADEMARK OFFICE
CERTIFICATE OF CORRECTION

| | | |
|---|---|---|
| PATENT NO. | : 11,314,989 B2 | Page 1 of 1 |
| APPLICATION NO. | : 16/924731 | |
| DATED | : April 26, 2022 | |
| INVENTOR(S) | : Andres Mauricio Munoz Delgado | |

It is certified that error appears in the above-identified patent and that said Letters Patent is hereby corrected as shown below:

On the Title Page

In Item (30) Foreign Application Data, replace:
"19187339"
With:
--19187339.7--

Signed and Sealed this
Twenty-eighth Day of June, 2022

Katherine Kelly Vidal
*Director of the United States Patent and Trademark Office*